United States Patent
Miller (10) Patent No.: US 10,278,534 B2
(45) Date of Patent: May 7, 2019

(54) BEVERAGE STEEPING AND DISPENSING SYSTEM

(71) Applicant: Jake Miller, San Francisco, CA (US)

(72) Inventor: Jake Miller, San Francisco, CA (US)

(73) Assignee: FELLOW INDUSTRIES INC., San Francisco, CA (US)

( * ) Notice: Subject to any disclaimer, the term of this patent is extended or adjusted under 35 U.S.C. 154(b) by 443 days.

(21) Appl. No.: 14/544,131

(22) Filed: Nov. 28, 2014

(65) Prior Publication Data

US 2015/0150406 A1     Jun. 4, 2015

Related U.S. Application Data (60) Provisional application No. 61/910,412, filed on Dec. 1, 2013, provisional application No. 61/998,259, filed on Jun. 23, 2014.

(51) Int. Cl.
*A47J 31/10*     (2006.01)

(52) U.S. Cl.
CPC ..................... *A47J 31/10* (2013.01)

(58) Field of Classification Search
CPC ........ A47J 31/10; A47J 31/467; A47J 31/446; A47J 31/0605; A47J 31/061; A47J 31/0615; A47J 31/0621; A47J 31/005; A47J 31/06; A47J 31/0626; A47J 31/0636
USPC ........... 99/282, 283, 289 R, 289 P, 298, 299, 99/300, 322, 323, 316, 317, 318, 319, 99/305, 297; 222/129, 143, 144, 145
See application file for complete search history.

(56) References Cited

U.S. PATENT DOCUMENTS

| | | | | |
|---|---|---|---|---|
| 316,885 A | * | 4/1885 | Dumont | C02F 1/42 210/284 |
| 323,637 A | * | 8/1885 | Connolly | B01D 17/045 210/300 |
| 347,581 A | * | 8/1886 | Dodge | A01J 11/08 210/337 |
| 426,489 A | * | 4/1890 | Connolly | B01D 24/26 210/337 |
| 433,659 A | * | 8/1890 | Schermerhorn | A01J 11/06 210/315 |
| 604,984 A | * | 5/1898 | Harder | C02F 1/001 210/266 |
| 881,564 A | * | 3/1908 | Epstein | A47J 31/0636 210/337 |
| 942,121 A | * | 12/1909 | White | B01D 29/03 210/314 |
| 950,211 A | * | 2/1910 | Reymore et al. | A01J 9/02 210/314 |
| 967,905 A | * | 8/1910 | Hagg | B01D 17/045 210/209 |

(Continued)

*Primary Examiner* — Jimmy Chou
(74) *Attorney, Agent, or Firm* — James A. Gavney, Jr.; JAG Patent Service (57) ABSTRACT

A system for steeping beverages is disclosed. The system includes a filtration unit and dispensing mechanism with a steeping vessel. The dispensing mechanism includes a disk with apertures and a sleeve. The sleeve is coupled to the filtration unit and moves down and up within the steeping vessel to a closed and open position, respectively. With the dispensing mechanism in the closed position the sleeve engages the disk and holds a steeped liquid within the filtration unit. In the open position the sleeve disengages the disk allows the steeped liquid to flow into a capturing vessel through the apertures.

10 Claims, 6 Drawing Sheets

(56) References Cited

U.S. PATENT DOCUMENTS

| | | | | |
|---|---|---|---|---|
| 989,752 A * | 4/1911 | Ansley | A01J 9/02 | 210/247 |
| 1,023,664 A * | 4/1912 | Laity | A01J 11/06 | 210/337 |
| 1,044,074 A * | 11/1912 | Nugent | B01D 29/58 | 210/187 |
| 1,053,573 A * | 2/1913 | Clemm | B01D 35/28 | 210/315 |
| 1,068,900 A * | 7/1913 | Herd | A01J 9/02 | 210/470 |
| 1,104,773 A * | 7/1914 | Bradshaw | A01J 9/02 | 210/318 |
| 1,216,112 A * | 2/1917 | Greven | A47J 31/06 | 210/477 |
| 1,317,717 A * | 10/1919 | McKenney | A47J 31/02 | 99/299 |
| 1,501,073 A * | 7/1924 | Stead | B01D 29/085 | 210/478 |
| 1,536,890 A * | 5/1925 | Lagemann | A01J 9/02 | 15/263 |
| 1,601,987 A * | 10/1926 | Topper | A47J 31/06 | 99/306 |
| 1,701,194 A * | 2/1929 | Rosenstein | A47J 31/02 | 99/285 |
| 1,876,474 A * | 9/1932 | Starkey | B65D 85/8043 | 53/443 |
| 1,889,111 A * | 11/1932 | Serr | B65D 85/816 | 206/217 |
| 2,000,309 A * | 5/1935 | Wentorf | A47J 31/02 | 99/306 |
| 2,003,658 A * | 6/1935 | Thomas | A01J 11/06 | 210/318 |
| 2,069,229 A * | 2/1937 | Ferris | A47J 31/02 | 99/299 |
| 2,285,114 A * | 6/1942 | Ferris | A47J 31/02 | 99/283 |
| 3,010,583 A * | 11/1961 | Kenyon | G01N 1/14 | 210/406 |
| 3,083,101 A * | 3/1963 | Noury | A47G 19/14 | 426/112 |
| 3,420,675 A * | 1/1969 | Costas | A47J 31/08 | 426/77 |
| 3,694,235 A * | 9/1972 | Siegel | B65D 85/816 | 206/0.5 |
| 3,695,168 A * | 10/1972 | Van Brunt | A47J 31/02 | 99/306 |
| 3,924,741 A * | 12/1975 | Kachur | B65D 51/2892 | 206/221 |
| 3,937,134 A * | 2/1976 | Molenaar | A47J 31/02 | 426/433 |
| 3,971,305 A * | 7/1976 | Daswick | A47J 31/02 | 210/474 |
| 3,985,069 A * | 10/1976 | Cavalluzzi | A47J 31/02 | 426/77 |
| 4,021,354 A * | 5/1977 | Lyon | B01D 29/055 | 210/477 |
| 4,167,136 A * | 9/1979 | Chupurdy | A47J 31/02 | 99/306 |
| 4,251,366 A * | 2/1981 | Simon | B01L 3/565 | 210/406 |
| 4,255,265 A * | 3/1981 | Greutert | A47J 31/0621 | 210/474 |
| 4,301,010 A * | 11/1981 | Eddleman | B01D 29/05 | 210/406 |
| 4,354,427 A * | 10/1982 | Filipowicz | A47J 31/0573 | 99/295 |
| 4,357,240 A * | 11/1982 | Mehra | B01D 29/05 | 210/455 |
| 4,417,504 A * | 11/1983 | Yamamoto | A47J 31/02 | 206/0.5 |
| 4,439,319 A * | 3/1984 | Rock | A61B 10/0096 | 210/238 |
| 4,446,158 A * | 5/1984 | English | A47J 31/02 | 426/77 |
| 4,520,716 A * | 6/1985 | Hayes | A47J 31/02 | 99/295 |
| 4,577,080 A * | 3/1986 | Grossman | A47J 31/547 | 219/689 |
| 4,614,585 A * | 9/1986 | Mehra | B01D 29/012 | 210/321.84 |
| 4,642,443 A * | 2/1987 | Jorgensen | A47J 31/053 | 219/689 |
| 4,673,501 A * | 6/1987 | Wells | B01D 29/03 | 210/406 |
| 4,689,147 A * | 8/1987 | Leoncavallo | B01D 29/05 | 210/232 |
| 4,702,834 A * | 10/1987 | Relyea | B01D 29/012 | 210/321.78 |
| 4,731,177 A * | 3/1988 | Hemman | B01D 29/03 | 210/241 |
| 4,783,318 A * | 11/1988 | Lapakko | B01D 11/0219 | 210/258 |
| 4,806,369 A * | 2/1989 | Thompson | B65D 85/812 | 206/15 |
| 4,833,979 A * | 5/1989 | Garulli | A47J 31/40 | 99/287 |
| 4,843,954 A * | 7/1989 | Henn | A47J 31/047 | 99/285 |
| 4,894,155 A * | 1/1990 | Leoncavallo | B01D 29/41 | 210/321.84 |
| 5,067,395 A * | 11/1991 | Timm | A47J 31/005 | 99/282 |
| 5,186,828 A * | 2/1993 | Mankin | B01D 29/27 | 210/232 |
| 5,192,424 A * | 3/1993 | Beyne | B01D 29/23 | 210/232 |
| 5,234,585 A * | 8/1993 | Zuk, Jr. | B01D 29/05 | 210/188 |
| 5,243,164 A * | 9/1993 | Erickson | A47J 31/02 | 219/689 |
| 5,259,295 A * | 11/1993 | Timm | A47J 31/005 | 99/282 |
| 5,309,823 A * | 5/1994 | Allen | A47J 31/053 | 426/433 |
| 5,318,703 A * | 6/1994 | Heiligman | A47J 31/605 | 210/264 |
| 5,393,548 A * | 2/1995 | Heiligman | A47J 31/605 | 210/264 |
| 5,411,661 A * | 5/1995 | Heiligman | A47J 31/605 | 210/264 |
| 5,490,927 A * | 2/1996 | Herczeg | B01D 61/18 | 210/321.75 |
| 5,590,581 A * | 1/1997 | Strub | A47J 31/0663 | 99/295 |
| 5,603,900 A * | 2/1997 | Clark | B01D 29/012 | 210/321.75 |
| 5,632,193 A * | 5/1997 | Shen | A47J 31/02 | 99/285 |
| 5,632,194 A * | 5/1997 | Lin | A47J 31/02 | 99/285 |
| 5,638,968 A * | 6/1997 | Baron | A61J 9/00 | 206/221 |
| 5,652,008 A * | 7/1997 | Heiligman | C02F 1/003 | 210/263 |
| D381,866 S * | 8/1997 | St-Gelais | D7/300 | |
| 5,725,765 A * | 3/1998 | Shen | A47J 31/02 | 210/238 |
| 5,775,206 A * | 7/1998 | St-Gelais | A47J 31/02 | 99/295 |
| 5,813,317 A * | 9/1998 | Chang | A47J 31/02 | 210/238 |
| 5,826,493 A * | 10/1998 | Tien Lin | A47J 31/061 | 99/299 |
| 5,832,809 A * | 11/1998 | Gras | A47J 31/547 | 219/689 |
| 5,853,581 A * | 12/1998 | Rayborn | A47J 43/24 | 210/241 |

(56) References Cited

U.S. PATENT DOCUMENTS

| | | | | |
|---|---|---|---|---|
| 5,855,160 A * | 1/1999 | Shen | A47G 19/14 | 99/279 |
| 5,862,739 A * | 1/1999 | Lin | A47J 31/02 | 99/285 |
| 5,914,045 A * | 6/1999 | Palmer | C02F 1/003 | 210/136 |
| 5,943,946 A * | 8/1999 | Chen | A47J 31/20 | 99/297 |
| 5,947,004 A * | 9/1999 | Huang | A47J 31/02 | 99/299 |
| 5,948,246 A * | 9/1999 | Zuk, Jr. | B01D 29/606 | 210/188 |
| 6,045,254 A * | 4/2000 | Inbar | A61J 9/00 | 206/222 |
| 6,103,116 A * | 8/2000 | Koslow | A47J 31/06 | 210/282 |
| 6,164,190 A * | 12/2000 | Tien Lin | A47J 31/18 | 99/299 |
| 6,276,262 B1 * | 8/2001 | Chen | A23F 3/18 | 426/435 |
| 6,327,965 B1 * | 12/2001 | Lin Tien | A47J 31/02 | 99/299 |
| 6,358,730 B1 * | 3/2002 | Kane | C12M 33/14 | 422/504 |
| 6,481,337 B1 * | 11/2002 | Guu | A47J 31/005 | 99/285 |
| 6,494,128 B1 * | 12/2002 | Yu | A47J 31/0605 | 99/285 |
| 6,913,152 B2 * | 7/2005 | Zuk, Jr. | B01D 29/05 | 210/406 |
| 7,150,219 B2 * | 12/2006 | De'Longhi | A47J 31/4496 | 99/299 |
| 7,182,864 B2 * | 2/2007 | Brown | C10M 175/0091 | 210/232 |
| 7,661,538 B1 * | 2/2010 | Zuk, Jr. | B01D 29/05 | 210/416.1 |
| 7,798,333 B2 * | 9/2010 | Zuk, Jr. | B01D 29/085 | 210/406 |
| 7,836,820 B2 * | 11/2010 | Hammad | A47J 31/0605 | 426/433 |
| 7,856,922 B2 * | 12/2010 | Tjen | A47J 31/02 | 426/77 |
| 7,926,414 B1 * | 4/2011 | Wolcott | A47J 31/005 | 210/469 |
| 8,039,036 B2 * | 10/2011 | Knitel | A47J 31/0647 | 426/433 |
| 8,158,009 B2 * | 4/2012 | Kane | B01D 29/05 | 210/406 |
| 8,318,011 B2 * | 11/2012 | O'Brien | C02F 1/002 | 210/106 |
| 8,342,337 B1 * | 1/2013 | Genovese | C02F 1/002 | 210/348 |
| 8,505,441 B2 * | 8/2013 | Bambi | A47J 31/002 | 99/283 |
| 8,516,949 B2 * | 8/2013 | Chen | A47J 31/005 | 99/299 |
| 8,635,946 B2 * | 1/2014 | White | A47J 31/061 | 99/279 |
| 8,757,049 B2 * | 6/2014 | Giessler | A47J 31/0615 | 99/306 |
| 8,808,552 B2 * | 8/2014 | Lin | B01D 29/085 | 210/232 |
| 8,875,753 B2 * | 11/2014 | Norris | B67C 11/02 | 141/2 |
| 9,521,923 B2 * | 12/2016 | Priley | A47J 31/407 | |
| 9,624,463 B2 * | 4/2017 | Wainwright | C12M 47/04 | |
| 2001/0009127 A1 * | 7/2001 | Timm | A47J 31/005 | 99/299 |
| 2004/0194631 A1 * | 10/2004 | Pope | A47J 31/4475 | 99/279 |
| 2005/0189288 A1 * | 9/2005 | Hershberger | A61M 1/0056 | 210/448 |
| 2005/0189290 A1 * | 9/2005 | Maiden | B01D 29/085 | 210/473 |
| 2005/0265903 A1 * | 12/2005 | Ross | B01D 53/0415 | 422/120 |
| 2009/0056557 A1 * | 3/2009 | Lin | A47J 31/02 | 99/323 |
| 2009/0101023 A1 * | 4/2009 | Kimura | A47J 37/1223 | 99/331 |
| 2009/0199518 A1 * | 8/2009 | Deuber | A47J 31/3628 | 53/492 |
| 2009/0294385 A1 * | 12/2009 | Tajima | B01D 61/145 | 210/808 |
| 2010/0031827 A1 * | 2/2010 | Lai | A47J 31/005 | 99/306 |
| 2010/0212509 A1 * | 8/2010 | Tien | A47J 31/0626 | 99/305 |
| 2010/0224078 A1 * | 9/2010 | Khalifa | A47J 31/20 | 99/323 |
| 2011/0005400 A1 * | 1/2011 | Tien | A47J 31/02 | 99/298 |
| 2011/0271845 A1 * | 11/2011 | Lee | A47J 31/02 | 99/295 |
| 2011/0284442 A1 * | 11/2011 | Williams | B01D 29/27 | 210/170.09 |
| 2011/0303094 A1 * | 12/2011 | Lown | A47J 31/0605 | 99/299 |
| 2012/0024161 A1 * | 2/2012 | Chen | A47J 31/0615 | 99/299 |
| 2012/0152865 A1 * | 6/2012 | Lin | B01D 29/085 | 210/808 |
| 2012/0186456 A1 * | 7/2012 | Kuempel | A47J 31/18 | 99/282 |
| 2012/0225176 A1 * | 9/2012 | DiStefano | A47J 31/52 | 426/435 |
| 2012/0241369 A1 * | 9/2012 | McLane | B01D 29/07 | 210/301 |
| 2013/0160655 A1 * | 6/2013 | Chen | A47J 31/18 | 99/299 |
| 2013/0160656 A1 * | 6/2013 | McCormick | A47J 31/4482 | 99/299 |
| 2013/0167731 A1 * | 7/2013 | Eidenbenz | A47J 31/0615 | 99/283 |
| 2014/0251153 A1 * | 9/2014 | Tien | A47J 31/0636 | 99/322 |

* cited by examiner

BEVERAGE STEEPING AND DISPENSING SYSTEM

RELATED APPLICATION

This application claims priority under 35 U.S.C. § 119(e) from the U.S. provisional patent application Ser. No. 61/910,412, filed on Dec. 1, 2013, and titled "METHOD AND APPARATUS FOR BREWING HOT AND COLD BEVERAGES" and the U.S. provisional patent application Ser. No. 61/998,259, filed on Jun. 23, 2014, and titled "APPARATUS WITH DUAL FILTRATION SYSTEM AND TWIST DISPENSING MECHANISM." The U.S. provisional patent application Ser. No. 61/910,412, filed on Dec. 1, 2013, and titled "METHOD AND APPARATUS FOR BREWING HOT AND COLD BEVERAGES" and the U.S. provisional patent application Ser. No. 61/998,259, filed on Jun. 23, 2014, and titled "APPARATUS WITH DUAL FILTRATION SYSTEM AND TWIST DISPENSING MECHANISM" are both hereby incorporated by reference.

FIELD OF THE INVENTION

This invention generally relates to a systems and methods for steeping beverages. More particularly, this invention relates to systems and methods for steeping beverages and dispensing beverages from a filtration unit through a controllable dispensing mechanism.

BACKGROUND OF THE INVENTION

There are many different methods for brewing and/or steeping beverages, such as coffee or tea. For example, coffee can be brewed by circulating hot water over coffee grounds through a filter (continual extraction; peculation methods) or by pushing steam or pouring hot water over coffee grounds through a filter (single extraction; espresso and drip methods).

In other methods beverages are steeped. For example, coffee or tea is steeped by placing coffee grounds or tea leafs in water, usually heated, for a predetermined period of time. The extracted coffee or tea is then removed from the expended coffee grounds or tea leafs by pouring the steeped beverage over a filter. In the case of a French Press, a filter is pressed through the steeping liquid within a steeping container to hold the expended coffee grounds or tea leafs on the bottom of steeping container while the steeped liquid is poured into a cup.

It is well recognized that the quality, the flavor and the strength of a steeped beverage, in addition to the quality of the raw materials used, depends on the steeping time and the quality of the filter used. Currently available beverage steeping systems make controlling the steeping time difficult, often have poor filters and can be difficult to maintain or clean.

SUMMARY OF THE INVENTION

The present invention is directed toward a system for steeping beverages. The system includes a filtration unit with at least one filter and a dispensing mechanism. The filtration unit is housed within a steeping vessel that preferable forms a dispensing volume around the filtrating unit. The system also preferably includes a capturing vessel for capturing a steeped liquid that is filtered through filtration unit and that is dispensed from the dispensing mechanism.

In accordance with the embodiments of the invention the filtration unit includes a first filter that forms a first reservoir and a second filter with a cup structure that forms a second reservoir. The first filter is preferably seated within the cup structure, thereby, forming a double filtration unit. The first filter is preferably made from stainless steel that is perforated with holes and the second filter preferably includes an etched glass frit that is seated in or supported by the cup structure. In accordance with this embodiment, the second filter is capable of filtering finer particulate matter than that of the first filter.

The dispensing mechanism of the system includes a disk or dispensing surface and a sleeve. The sleeve is preferably formed from silicon, rubber or any other suitable compressible or malleable material. The sleeve is shown herein as being round, but it will be clear to one skilled in the art from the description below that the sleeve can be any shape as long as the sleeve provides a continuous edge to create a seal when contacted or engaged with the disk or dispensing surface. The sleeve is couple to or is attached to the filtration unit below the second filter. In operation the sleeve contacts or engages the disk or dispensing surface in a closed position and holds a steeped liquid within the first reservoir, second reservoir and a space between the second filter and the disk or dispensing surface. After a period of time (steeping time) the sleeve is displaced from the disk or the dispensing surface to an open position and thereby allowing the steeped liquid to be dispensed through the filtration unit and from the dispensing mechanism. The disk or dispensing surface of the dispensing mechanism preferably has one or more apertures through which the steeped liquid is dispense into the capturing vessel.

In accordance with the embodiments of the invention, the dispensing mechanism is placed in the open position and in the closed position by moving a portion of the filtration unit up and down within the steeping vessel. When the dispensing mechanism is in the closed position, the one or more apertures of the disk or dispensing surface are isolated from the filtration unit and when the dispensing mechanism is in the open position the one or more apertures of the disk or dispensing surface are in liquid communication filtration unit, thus allowing the steeped liquid to be dispensed through the apertures and into the capturing vessel. Once the steeped liquid is in the capturing vessel, the dispensing unit can be placed back into the closed position and the steep liquid can be dispensed through the dispensing volume between the filter unit and the steeping vessel.

The dispensing mechanism is placed in the open position and closed position by moving a portion of the filtration unit and the sleeve up and down within the steeping vessel using any suitable means including, but not limited to, matted or threaded track and grove features. In accordance with this embodiment of the invention, turning or twisting a portion of the filtration unit in one direction places the dispensing mechanism in one of the open or closed position and turning or twisting a portion of the filtration unit in the opposite direction places the dispensing mechanism in the other of the open or closed position.

In further embodiments of the invention the system includes a removable top with pattered or textured edges that attaches to or covers the filtration unit and assists in turning or twisting the filtration unit to move the filtration unit and the sleeve up and down within the steeping vessel. The filtration unit the dispensing mechanism, or a portion thereof, can be fashioned to be removable for cleaning and replacing. Further, the steeping vessel and the capturing vessel of the system can be monolithic or detachably coupled together.

DETAILED DESCRIPTION OF THE INVENTION

Figure 1A:
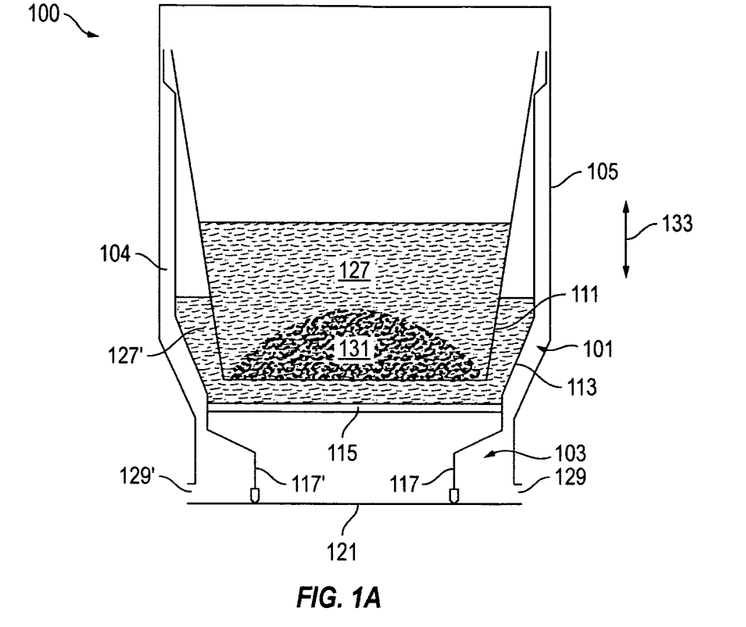
FIG. 1A shows a steeping vessel with a filtration unit and dispensing mechanism contained therein and in a closed position, in accordance with the embodiments of the invention.

FIG. 1A shows view 100 a system for steeping beverages and in a closed position. The system includes a steeping vessel 105 with a filtration unit 101 and dispensing mechanism 103 contained therein, as indicated by 104. The filtration unit 101 includes a first filter 111 that forms a first reservoir and a second filter 115 and cup structure 113 the forms a second reservoir, wherein the first filter is positioned within the cup structure 113. The dispensing mechanism 103 includes a disk 121 and a sleeve 117 and 117' attached to the filtration unit 101 and below the second filter 115, wherein the sleeve 117 and 117' contacts or engages the disk 121 in the closed position, as shown, and holds a steeped liquid 127 and 127' within the first reservoir, second reservoir and a space between the second filter 115 and the disk 121.

Figure 1B:
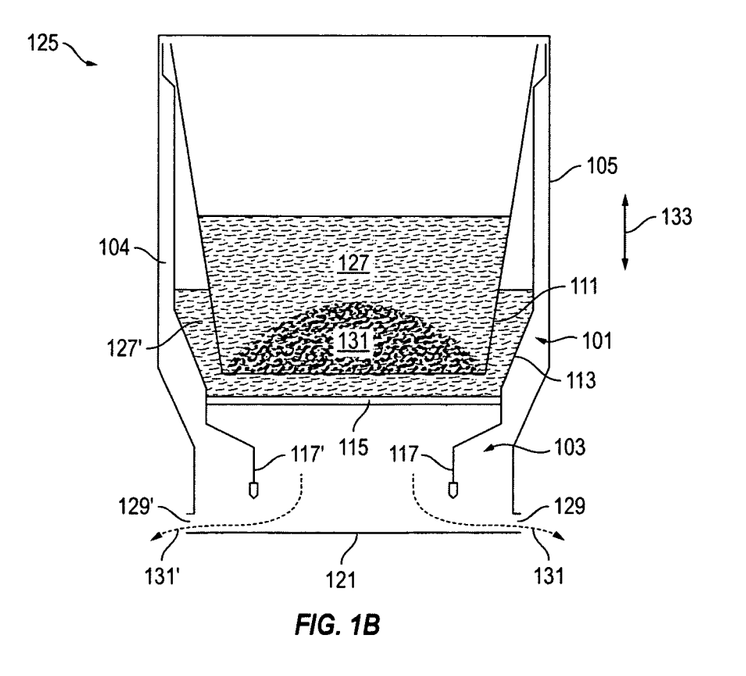
FIG. 1B shows a steeping vessel with a filtration unit and dispensing mechanism contained therein and in an open position, in accordance with the embodiments of the invention.

FIG. 1B shows view 125 of a steeping vessel 105 with a filtration unit 101 and dispensing mechanism 103 contained therein and in a open position. As described above, the filtration unit 101 includes the first filter 111, the second filter 115 and the cup structure 113 and the dispensing mechanism 103 includes the disk 121 and the sleeve 117 and 117'. In the open position, as shown, the sleeve 117 and 117' is displaced from or disengaged from the disk 121 thereby allowing the steeped liquid 127 and 127' to be dispensed from the filtration unit 103 through the second filter 115, as shown by the arrows 131 and 131'. Preferably, the system is place in the open and closed positions by moving a portion of the filtration unit 101 and the sleeve up and down within the steeping vessel 105 and indicated by the arrow 133.

In operation a steeping material 131, such as coffee or tea, is placed within the reservoir of the first filter 111. Then a liquid, such as hot water, is poured into the reservoir of the first filter 111 with the system in the closed positions, as shown in FIG. 1A. The steeped liquid 127 form the first filter 111 flows into the second reservoir, as indicated by 127' and also into the area between the disk 121 and the second filter 115. After a period of time, the system is placed in the open position, as shown in FIG. 2B, and the steeped liquid 127 and 127' flows through the second filter 115, as indicated by the arrows 131 and 131'. After the steeped liquid is dispensed, the expended steeping material can be discarded.

Figure 2A:
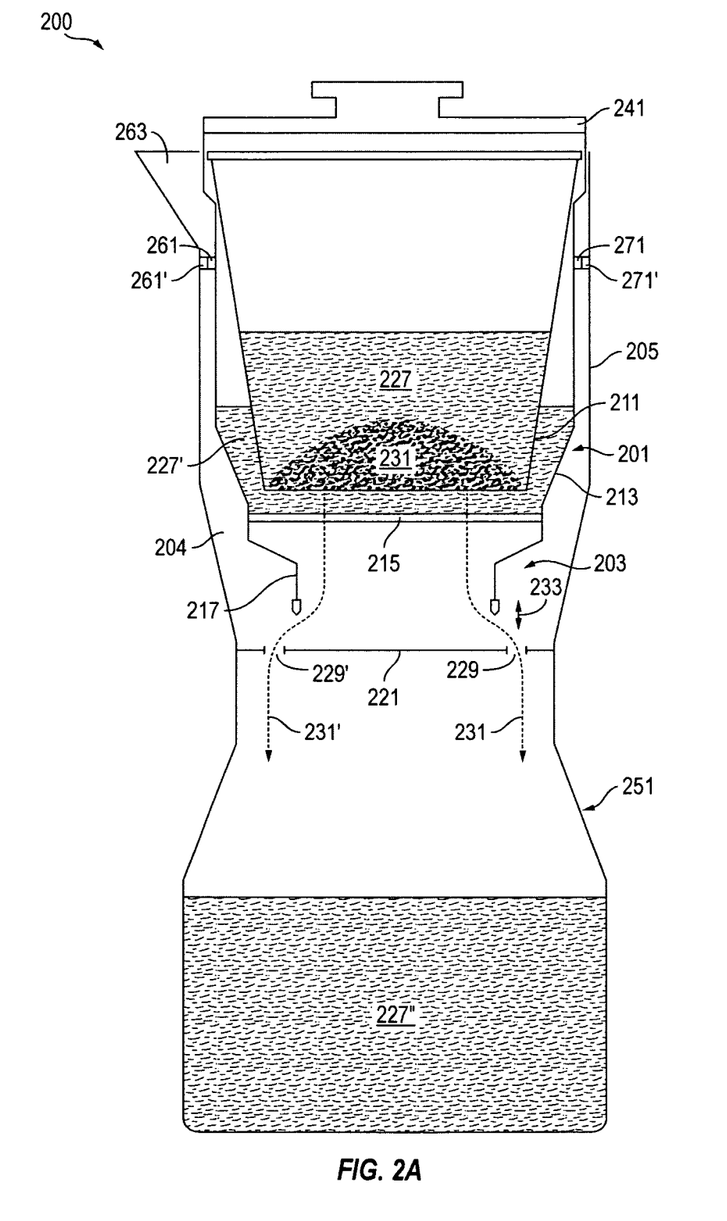
FIG. 2A shows a system with a steeping vessel with a filtration unit and dispensing mechanism coupled to a capturing vessel in an open position, in accordance with the embodiments of the invention.
Figure 2B:
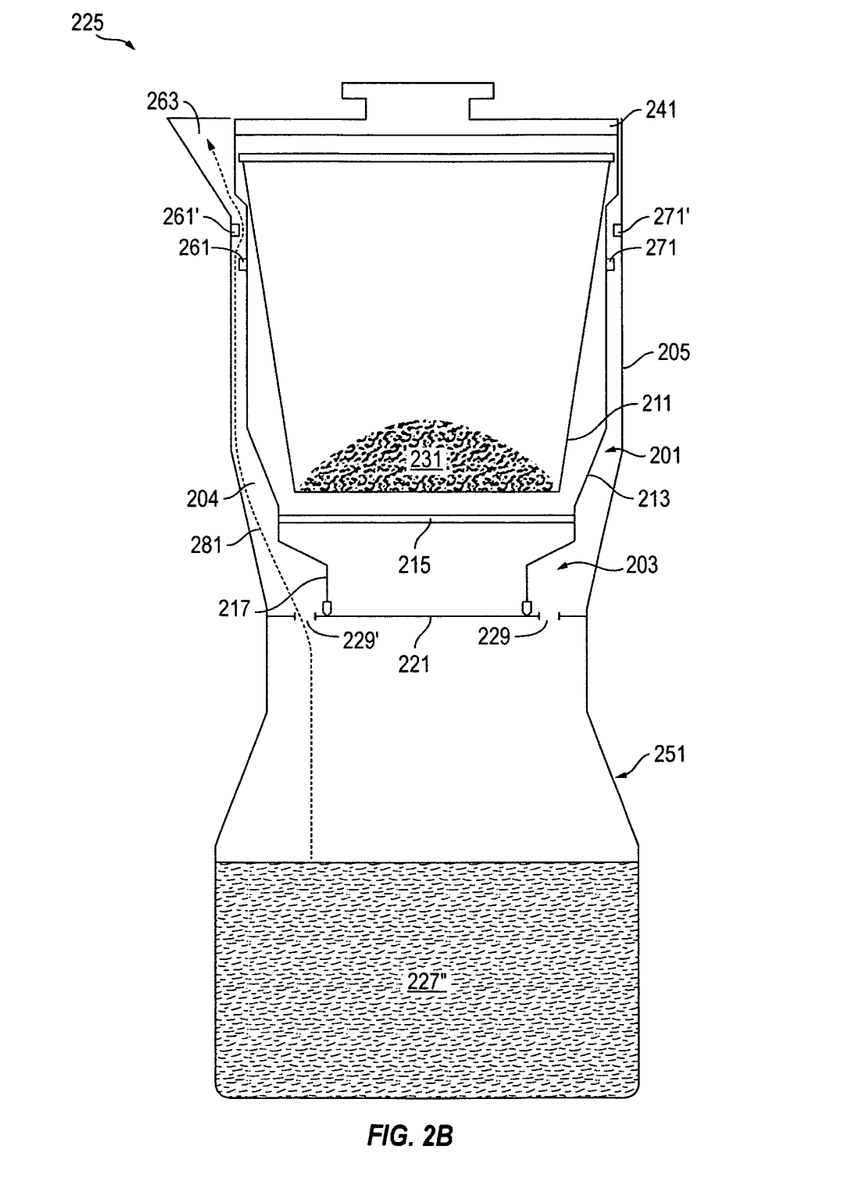
FIG. 2B shows a system with a steeping vessel with a filtration unit and dispensing mechanism coupled to a capturing vessel in an closed position, in accordance with the embodiments of the invention.

FIG. 2A shows a view 200 a system for steeping beverages in a open position and FIG. 2B shows a view 225 the system for steeping beverages in a closed position. The system includes a steeping vessel 205 with a filtration unit 201 and dispensing mechanism 203 contained therein. A space between the steeping vessel 205 the filtration unit 201 and between the dispensing mechanism 203 form a dispensing volume 204.

The filtration unit 201 includes a first filter 211 and a second filter 215 and cup structure 213, as described above with reference to FIGS. 1A-B. The first filter 215 is preferably made from stainless steel that is perforated with holes (not shown) and the second filter 215 preferably includes an etched glass frit that is seated in or supported by the cup structure 213.

The dispensing mechanism 203 includes a disk 221 and a sleeve 217 that is attached to the filtration unit 201 and below the second filter 215. The sleeve 217 is preferably formed from silicon, rubber or any other suitable compressible or malleable material. The disk 221 includes apertures 229 and 229' that provide the liquid communication between the dispensing volume 204 and the capturing vessel 251.

In operation, a steeping material 231 is placed within the first filter 211 and liquid is poured into the first filter 211 with the system in the closed position, as shown in FIG. 2B, and the steeped liquid is contained within the filtration unit 201 and the space between the disk 221 and sleeve 217. After a period of time, the system is placed in the open positions, as shown in FIG. A, and the steeped liquid 227 and 227' flows through the second filter 215 and through the apertures 229 and 229', as indicated by the arrows 231 and 231' and into the capturing vessel 251, as indicated by 227". After the steeped liquid 227" is dispensed into the capturing vessel 251, the system can be placed back into the closed position, as shown in FIG. 2B, and the steeped liquid 227" can be poured from the capturing vessel through the apertures 229 and 229' and though the dispensing volume 204 to a spout 263, as indicated by the arrow 281.

The system is place in the open position (FIG. 1A) and the closed position (FIG. 2B) by moving a portion of the filtration unit 201 and the sleeve 217 up and down within the steeping vessel 205 and indicated by the arrow 233. Preferably, the portion of the filtration unit 201 and the sleeve 217 are moved up and down within the steeping vessel using matted or threaded track and grove features 261/261' and 271/271', whereby turning or twisting a portion of the filtration unit in one direction places the system in one of the open or closed position and turning or twisting a portion of the filtration unit in the opposite direction places the system in the other of the open or closed position.

In further embodiments of the invention the system includes a removable top or lid 241 that can have pattered or textured edges and that attaches to/or covers the filtration unit. The a removable top or lid 241 and assists in turning or twisting the filtration unit to move the portion of the filtration unit 201 and the sleeve 217 up and down within the steeping vessel 205. The filtration unit the dispensing mechanism, or a portion thereof, can be fashioned to be removable for cleaning and removing expended steeping material 231 and/or replacing a portion of the filtration unit 201 or the dispensing mechanism 203. Further, the steeping vessel 205 and the capturing vessel 251 of the system can be monolithic or detachably coupled. Preferably, the capturing vessel 251, or a portion thereof, is formed from glass.

Figure 3:
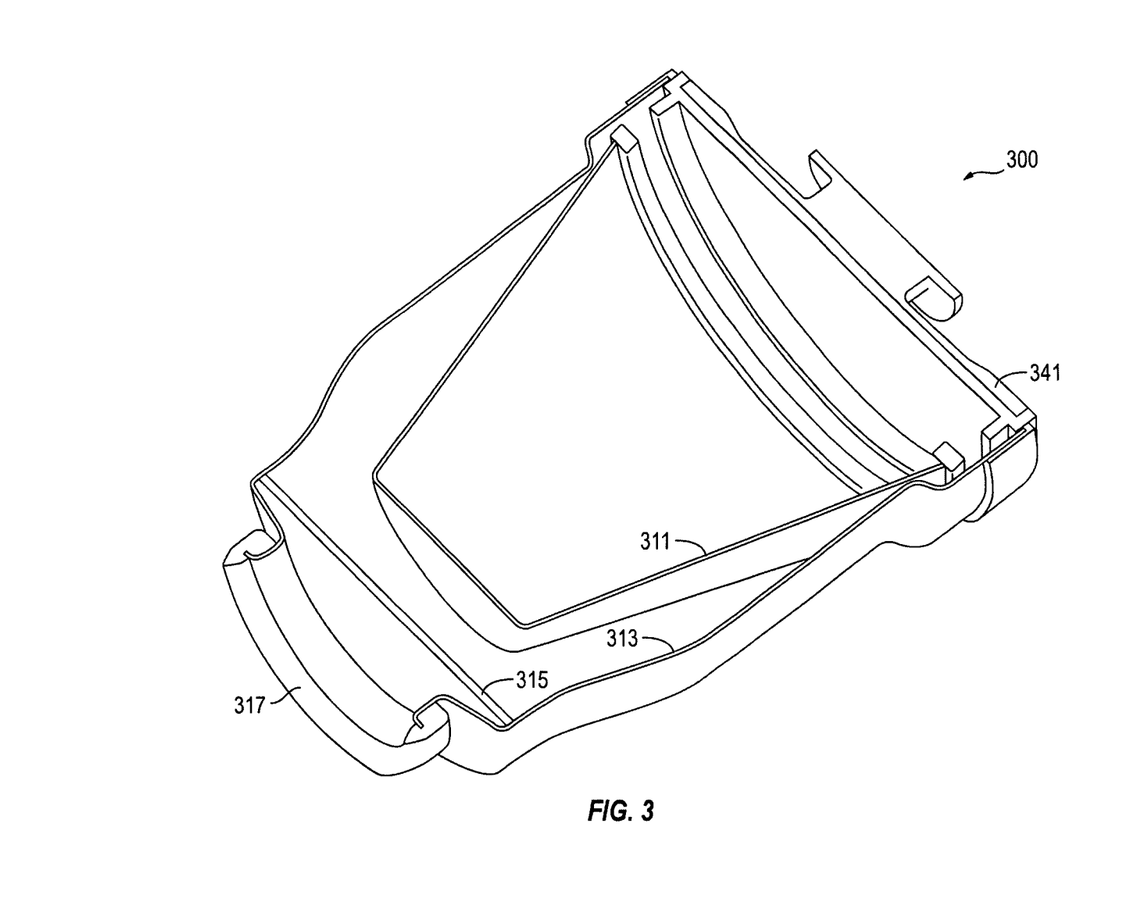
FIG. 3 shows a cross-section view of the double filtration unit coupled to a sleeve, in accordance with the embodiments of the invention.

FIG. 3 shows a cross-section view of the double filtration unit 300 coupled to a sleeve 317, in accordance with the embodiments of the invention. The double filtration unit 300 includes a first filter 311 and a second filter 315 seated in a cup structure 313, as described above. The double filtration unit 300 includes a lid or top 341 that covers the first reservoir and second reservoir of the double filtration unit 300 and facilities twisting the double filtration unit 300 within a steeping vessel (105; FIGS. 1A-B and 205 FIGS. 2A-B) to move the double filtration unit 300 and the sleeve 317 up and down within the steeping vessel.

Figure 4:
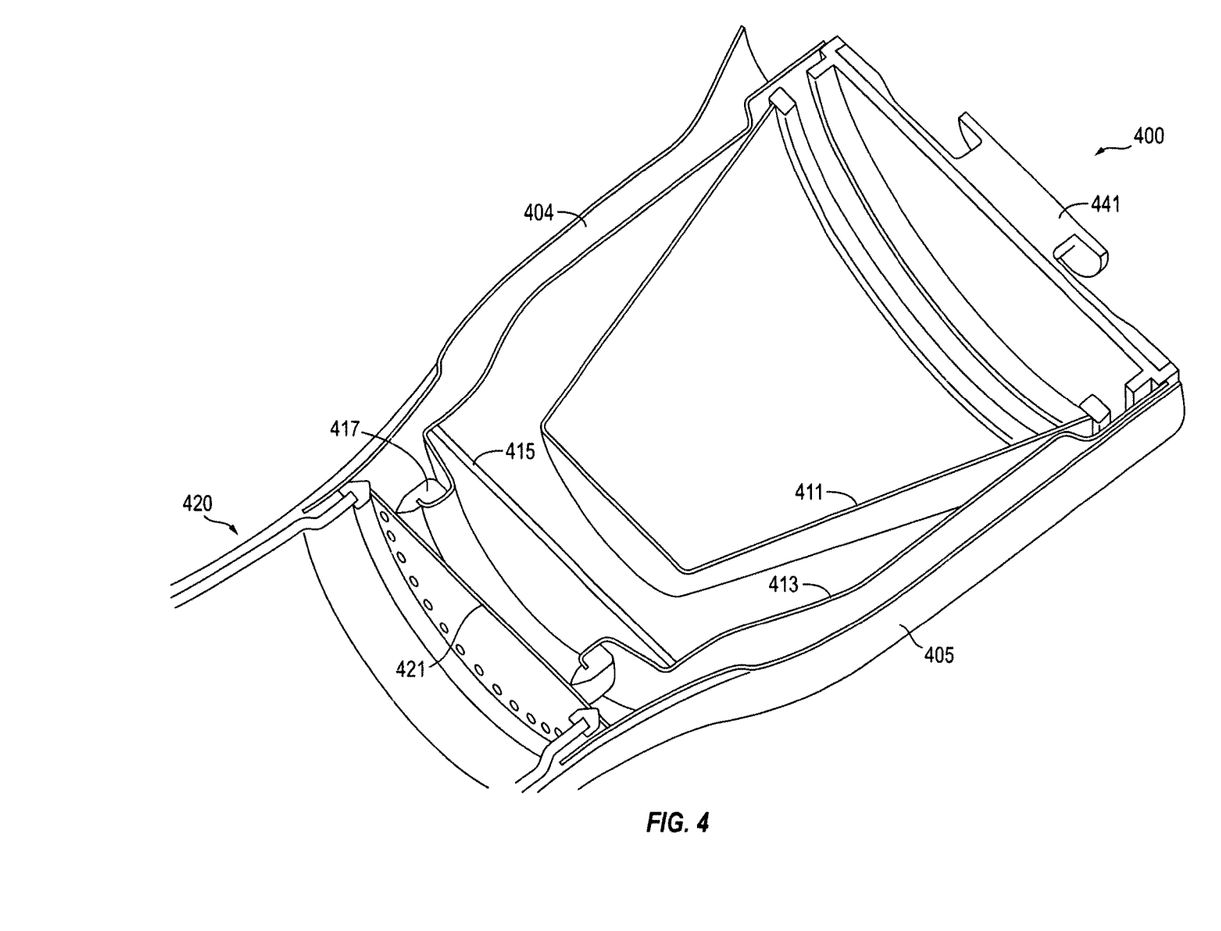
FIG. 4 shows a cross-section view of the double filtration unit and dispensing mechanism within a steeping vessel, in accordance with the embodiments of the invention.

FIG. 4 shows a cross-section view 400 of the double filtration unit and dispensing mechanism within a steeping vessel 405 and coupled to a neck portion 420 of a capturing vessel. The double filtration unit includes a filter 411, a second filter 415 seated in a cup structure 413 and a lid or top 441. The dispensing mechanism includes a sleeve 417 coupled to the double filtration unit below the second filter 415 that engages and disengages a disk or dispensing surface 421 having a plurality of apertures to dispense a steeped liquid therefrom, as described in detail above.

Figure 5:
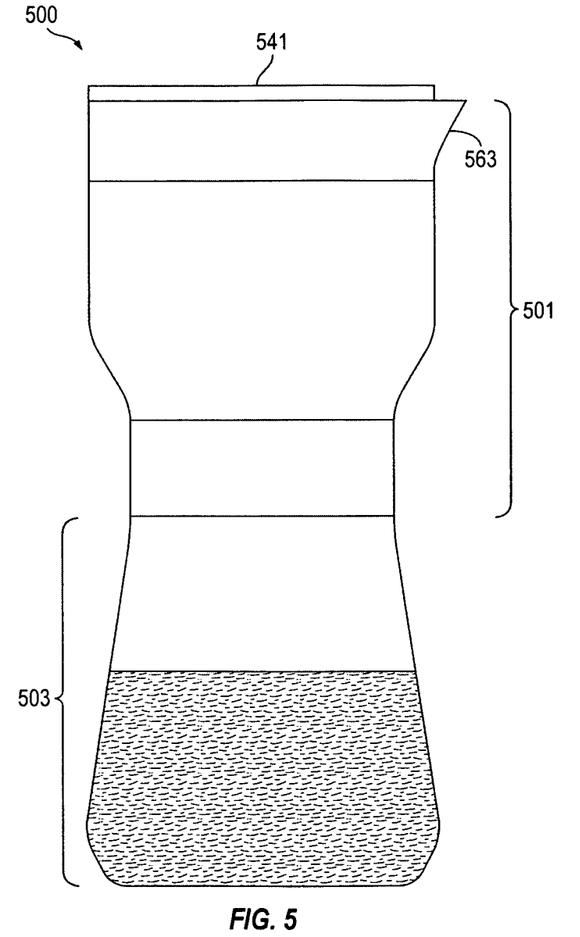
FIG. 5 shows an exterior view of system for steeping beverages including a steeping unit coupled to a capturing unit, in accordance with the embodiments of the invention.

FIG. 5 shows an exterior view of system 500 for steeping beverages including a steeping unit 501 coupled to a capturing unit 503. The dispensing unit 501 includes a steeping vessel, a filtration unit, dispensing mechanism and a lid or top 541, as described above, with reference to FIGS. 2A-B, FIG. 3 and FIG. 4). In accordance with this embodiments of the invention the steeping vessel of the steeping unit 501 and the capturing vessel of the capturing unit 503 are monolithic, but formed for different materials.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A system for steeping liquid comprising:
   a) a filtration unit comprising a first filter that forms a first reservoir and a second filter and a cup structure that surround the first filter and forms a second reservoir between the first filter, the second filter and walls of the cup structure;
   b) a dispensing mechanism comprising a disk positioned below the second filter with apertures and a sleeve attached to the cup structure and that engages the disk in a closed position in order to isolate the steeped liquid from the apertures and hold the steeped liquid within the first reservoir and the second reservoir and wherein the sleeve is disengaged from the disk in order to dispense the steeped liquid from the filtration unit and through the apertures;
   c) a capturing vessel coupled to the filtration unit for capturing the steeped liquid dispensed from the filtration unit through the apertures and into the capturing vessel; and
   d) a steeping vessel for housing the filtration unit and forming a dispensing volume between the steeping vessel and the cup structure, wherein the dispensing volume is in liquid communication with the capturing vessel through the apertures, such that the steeped liquid captured within the capturing vessel is capable of being poured from the capturing vessel through the apertures and through the dispensing volume and out of a spout with the sleeve engaged with the disk in the closed position.

2. The system of claim 1, wherein the sleeve engages the disk to the closed position and disengages the disk to the open position by moving the filtration unit down and up within the steeping vessel.

3. The system of claim 2, further comprising mated track and grooved or threaded features on a portion of the steeping vessel and a portion of the filtration unit that cause the dispensing mechanism to move up and down within the steeping vessel by twisting the filtration unit.

4. The system of claim 1, wherein the first filter is formed from stainless steel and the second filter includes etched glass.

5. The system of claim 1, wherein at least a portion of the capturing vessel is glass.

6. A system comprising:
   a) a removable filtration unit comprising a first filter that forms a first reservoir and a second filter and a cup structure that surround the first filter and forms a second reservoir between the first filter, the second filter and walls of the cup structure;
   b) a dispensing mechanism comprising a disk with apertures and a sleeve attached to the removable filtration unit below the second filter that is engages the disk in a closed position to isolate a steeped liquid within the removable filtration unit from the apertures and wherein the sleeve disengages from the disk in order to dispense the steeped liquid from the removable filtration unit and through the apertures;
   c) a capturing vessel for capturing the steeped liquid dispensed from the removable filtration unit and through the apertures and into the capturing vessel; and
   d) a steeping vessel for housing the removable filtration unit, wherein the steeping vessel forms a dispensing volume between the steeping vessel and the removable filtration unit, the dispensing volume being in liquid communication with the capturing vessel through the apertures, such that the steeped liquid captured within the capturing vessel is capable of being poured from the capturing vessel through the apertures and through the dispensing volume and out of a spout with the sleeve engaging the disk in the closed position which isolates the first filter and the second filter from the steeped liquid captured.

7. The system of claim 6, wherein the sleeve engages the disk to the closed position and disengages the disk to the open position by moving the filtration unit down and up within the steeping vessel.

8. The system of claim 7, further comprising mated track and grooved or threaded features on a portion of the steeping vessel and a portion of the cup structure that cause the cup structure and the sleeve to move up and down within the steeping vessel by twisting the cup structure.

9. The system of claim 8, further comprising a top that couples to the cup structure and is used for twisting cup structure within the steeping vessel.

10. A system for steeping liquid comprising: a steeping vessel with a filtration unit contained therein, the filtration unit comprising a first filter that forms a first reservoir and a second filter and a cup structure that surround the first filter and forms a second reservoir between the first filter, the second filter and walls of a cup structure and a dispensing mechanism that includes a sleeve below the second filter and a disk with apertures positioned below the sleeve, wherein the cup structure is moved up within the steeping vessel to disengage the sleeve with the disk and expose the apertures to the second filter to cause a steeped liquid contained within the cup structure to flow through the apertures into a capturing vessel and wherein the cup structure is moved down to engage the sleeve with the disk and isolate the apertures from the second filter such as to allow the steeped liquid to be poured from the capturing vessel and through a dispensing volume between the steeping vessel and the cup structure and wherein the apertures are in liquid communication with the dispensing volume.

\* \* \* \* \*